J. C. ROYCE.
ELECTRIC HEATER.
APPLICATION FILED MAY 14, 1909.

960,409.

Patented June 7, 1910.

Witnesses.
H. Dennison
Wm. McKair

Inventor:
J. C. Royce
by
E. J. Fetherstonhaugh
atty.

UNITED STATES PATENT OFFICE.

JAMES CHARLES ROYCE, OF TORONTO, ONTARIO, CANADA.

ELECTRIC HEATER.

960,409.  Specification of Letters Patent.  Patented June 7, 1910.

Application filed May 14, 1909. Serial No. 495,923.

*To all whom it may concern:*

Be it known that I, JAMES CHARLES ROYCE, a subject of the King of Great Britain, and resident of the city of Toronto, county of York, Province of Ontario, in the Dominion of Canada, have invented certain new and useful Improvements in Electric Heaters, of which the following is a specification.

The invention relates to improvements in electric heaters, as described in the following specification and illustrated in the accompanying drawings that form part of the same.

The invention consists essentially in the novel construction and arrangement of the windings of the heating coils and the electrical connections thereto, whereby variations in temperature may be obtained and the maximum efficiency secured.

The objects of the invention are, to economize in the consumption of electric energy, to obtain a large heat distributing area, to eliminate vibration of the coils and consequently any humming, and to devise an electric heating element of compact form which may be readily adapted to various shapes and uses and which may be manufactured at very low cost.

Figure 1:
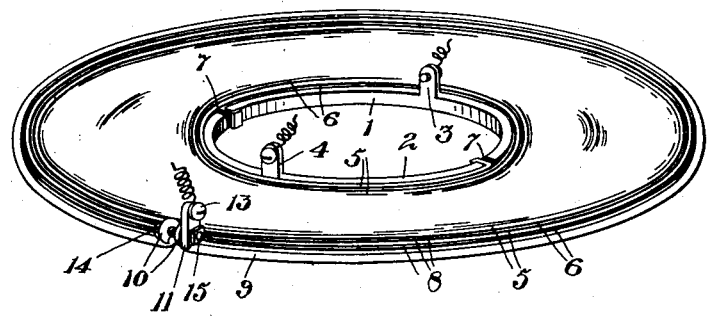
Figure 2:
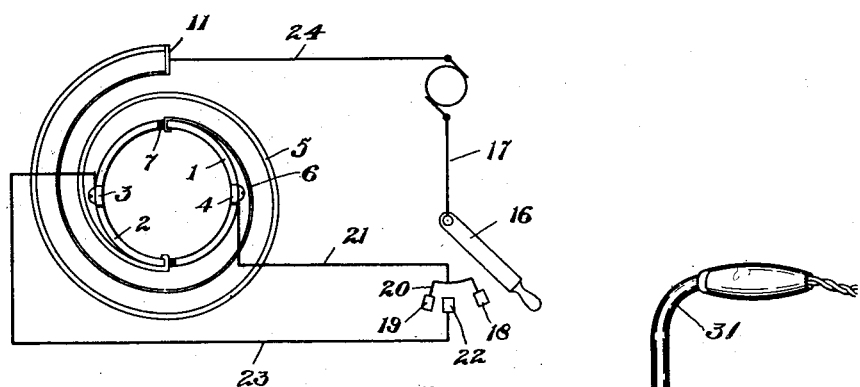
Figure 4:
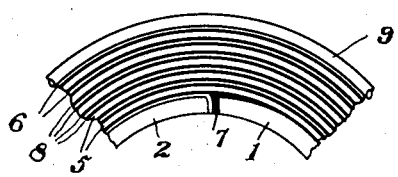
Figure 5:
Figure 3:
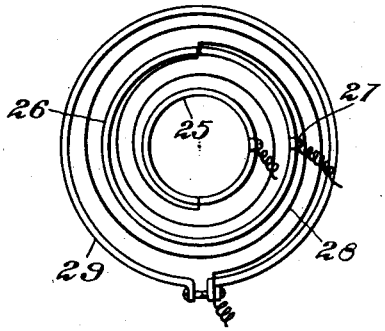

In the drawings, Figure 1 is a perspective view of a circular form of the heater. Fig. 2 is a diagrammatic view of the heater showing the electrical connections thereto arranged so that the coils may be connected to generate three different degrees of heat. Fig. 3 is a diagrammatic view of a modified form of arrangement of the coils. Fig. 4 is an enlarged view of a segment of the heater. Fig. 5 is a perspective view of one form of the device to which the heater may be applied.

Like numerals of reference indicate corresponding parts in each figure.

Referring to the drawings, 1 and 2 are metal segments preferably formed of soft iron and here shown as semi-circular in form, though it must be understood that they may be semi-elliptical or of any other desired shape.

3 and 4 are binding posts or terminals secured to or forming part with the segments 1 and 2 and extending outwardly therefrom.

5 and 6 are heat generating coils in the form of ribbons of soft iron or other suitable metal, the coil 5 being considerably thicker than the coil 6. The inner ends of each of the coils 5 and 6 are inserted between the opposing ends of the segments 1 and 2 and each insulated from the opposite segment by the insulating material 7. The coils are wound tightly around the segments 1 and 2 and insulated from each other by strips of mica or other suitable insulating material 8 inserted between the said coils. Each coil or winding contacts with the outer edge of its respective segment for the major portion of the length of its segment in order to insure a perfectly electrical contact. The successive windings of the generating coils and the insulations are wound tightly around the ring formed by the segments, the inner ends being gripped securely between the opposing ends of said segments.

9 is a band of heavy wire encircling the outer periphery of the coils having the eyes 10 formed at the ends thereof and turned outwardly.

11 is a binding post having a threaded orifice therein and a suitable binding screw 13 at its upper end.

14 is a screw inserted through the eye shaped ends of the band 9 and the threaded orifice of the binding post 11.

15 is a lock nut turning on the threaded end of the screw 14 and securing the binding post and band 9 firmly in position.

The outer ends of the coils 5 and 6 are electrically connected together and secured to the terminal or binding post 11.

16 is an electric switch here shown in the form of a pivotal lever, said switch being electrically connected to the wire 17 leading from a suitable electric current supply.

18 and 19 are electrical contacts electrically connected together by the wire 20 and to the terminal 4 of the lighter weight coil 6 by the wire 21, said contacts being arranged in the path of the switch 16 and adapted to form an electrical connection therewith.

22 is an electric contact piece arranged between the contacts 18 and 19 and close to the contact 19 so that the switch 16 may rest upon both of said contacts at once and make an electrical connection therewith.

23 is a wire connected to the contact 22 and leading to the terminal 3 of the heavier heating coil 5.

24 is a wire leading from the terminal 11 to the electrical current supply, herein indicated as an electric generator.

In the use of this device the switch 16 is moved into electrical contact with the contact piece 18 thereby closing an electric circuit through the wire 21 and lighter coil 6 and as the said coil has the lesser electric capacity it produces the minimum heat given off by the heater.

The insulations between the coils 5 and 6 are sufficient to electrically separate them but a considerable amount of heat will pass through the insulations and the heavier metal of the coil 5 conducts the heat produced by the coil 6 to the surface of the heating device and therefore distributes the heat uniformly over the entire surface of the heater. On the movement of the switch 16 to make an electrical connection with the contact 22 the coil 6 is cut out and the current then flows through the wire 23 and coil 5 and as the said coil 5 has a greater electric capacity than the coil 6, considerably more heat will be generated than when the current is flowing through the coil 6. The coil 5 of course in this instance is electrically dead and assists in the distribution of the heat.

In order to produce the maximum heat the switch 16 is moved so as to make an electrical connection with both the contacts 19 and 22. The current then flows through the wires 21 and 23 and the coils 5 and 6 and heats both coils simultaneously thus giving off the greatest possible amount of heat. It will therefore be seen that three distinct graduations of heat can be produced with this device. The form of switch herein shown is merely diagrammatic and it must be understood that other forms may be used with equal facility.

In the modified form of the arrangement of coils shown in Fig. 3, the coils are wound one within the other, the inner coil being wound tightly on a central ring 25 and each of its successive windings suitably insulated. 26 is a split ring surrounding the inner coil, the outer end of said coil being electrically connected thereto, said ring having a terminal 27 extending outwardly therefrom. 28 is the outer coil electrically connected at its inner end to the ring 26 and said coil is wound tightly around said ring binding it securely around the inner coil, each winding of said outer coil being suitably insulated. The whole is bound together by the outer ring 29 corresponding to the ring 9. In this arrangement of the coils the outer terminal of the inner and the inner terminal of the outer coils are electrically connected together through the ring 27 and the free ends of said coils are suitably connected to the switch controlling mechanism in the same manner as the coils 5 and 6.

The device shown in Fig. 5 illustrates one means of application of my device. The heater coil and its connections are inclosed within a flat circular water tight casing 30 and said casing is provided with a handle 31 extending upwardly therefrom. This form of device is particularly adapted for placing inside of a utensil to heat the contents thereof by submersion.

A heater as herein described may be adapted very readily to any form of electric stove, sad irons, or in fact to any form of heater, the change merely involving differences in shape.

A very important feature in the present construction of heater is the binding of the coils by the outside wire 9. The screw adjustment allows the ends to be drawn very tightly and the ribbons held securely so that vibration or movement between the successive windings is obviated, consequently avoiding fracture of the windings.

With the arrangement of coils shown in Fig. 3, a switch may be arranged to connect the coils singly, in parallel and in series, thus arranging so that the center coil may be heated alone or with the outer coil either in series or parallel.

What I claim as my invention is:—

1. In an electric heater a ring of suitable metal split laterally and having a terminal secured to or forming part therewith, a heavier coil of suitable metal having one end inserted through the lateral split in said ring and clamped between the ends thereof and electrically contacting with the outer surface of said ring and having its successive windings insulated from each other, and a ring encircling said heater coil and binding the windings thereof and the insulations between said windings securely together.

2. In an electric heater, a heater coil formed of a strip of metal wound in volute form, and a band encircling said coil and clamped thereto and electrically contacting with the outer winding of said coil.

3. In an electric heater, a plurality of strips of metal wound in volute coils one within the other and having their several windings insulated from each other, and a band encircling said composite coil and clamped thereto.

4. In an electric heater, a plurality of strips of metal wound together in volute form, and strips of insulating material wound between the windings of said coils.

5. In an electric heater a pair of metal strips wound together in volute form and electrically insulated from each other in their several windings, one of said coils being of much thicker metal than the other, and a band encircling said composite coil and clamped therearound.

6. In an electric heater, a heater coil formed of a strip of metal wound in volute form and having its several windings insulated from each other, a band encircling said coil and having eye-shaped ends bent outwardly, and a bolt extending through the eye-shaped ends of said band and clamping said band securely around said coil.

7. In an electric heater, a plurality of strips of metal wound in coils one within the other and having their several windings insulated from each other and electrically connected together at one of their ends and having their other ends free, a terminal electrically connected to the united ends of said coils, terminals electrically connected to the free ends of said coils, and an electric switch electrically connected to said terminals and to an electric current supply and directing the flow of current variously through said coils.

8. In an electric heater, a thin flat strip of metal wound in volute form, a layer of insulating material wound between the coils of said metal strip, and a metal band of greater cross sectional area than the said strip encircling said coil and having its ends adjustably secured together.

9. In an electric heater a thin flat strip of metal wound in volute form, a layer of insulating material wound between the coils of said metal strip, and a band of round steel wire encircling said coil and having loops formed at its ends, and means for drawing said loops together.

Signed at the city of Toronto, county of York, Province of Ontario in the Dominion of Canada, this 4th day of May 1909.

JAMES CHARLES ROYCE.

Witnesses:
H. DENNISON,
E. HERON.